(12) United States Patent
Iida et al.

(10) Patent No.: US 9,296,345 B2
(45) Date of Patent: Mar. 29, 2016

(54) VEHICLE FRONT STRUCTURE

(71) Applicants: Akira Iida, Toyota (JP); Kenji Matsuura, Miyoshi (JP); Ryosuke Nomura, Nagoya (JP); Shuuitsu Yamamoto, Miyoshi (JP)

(72) Inventors: Akira Iida, Toyota (JP); Kenji Matsuura, Miyoshi (JP); Ryosuke Nomura, Nagoya (JP); Shuuitsu Yamamoto, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/761,585

(22) PCT Filed: Feb. 6, 2014

(86) PCT No.: PCT/IB2014/000120
§ 371 (c)(1),
(2) Date: Jul. 16, 2015

(87) PCT Pub. No.: WO2014/122521
PCT Pub. Date: Aug. 14, 2014

(65) Prior Publication Data
US 2015/0336519 A1   Nov. 26, 2015

(30) Foreign Application Priority Data

Feb. 8, 2013   (JP) ................. 2013-023553

(51) Int. Cl.
*B62D 25/06*   (2006.01)
*B60R 13/08*   (2006.01)
*B62D 21/15*   (2006.01)

(52) U.S. Cl.
CPC .......... *B60R 13/0815* (2013.01); *B62D 21/152* (2013.01); *B62D 25/06* (2013.01)

(58) Field of Classification Search
CPC ........................... B60R 13/0815; B62D 25/06
See application file for complete search history.

(56) References Cited

U.S. PATENT DOCUMENTS

| | | | | |
|---|---|---|---|---|
| 2013/0257101 A1* | 10/2013 | Shono | .................... | B62D 25/06 296/191 |
| 2014/0138988 A1* | 5/2014 | Kisaku | .................... | B62D 25/02 296/210 |
| 2015/0115662 A1* | 4/2015 | Joyce | .................... | B62D 25/06 296/193.12 |

FOREIGN PATENT DOCUMENTS

| | | |
|---|---|---|
| FR | 1260610 A | 5/1961 |
| JP | 2005-231496 A | 9/2005 |
| JP | 2006-076371 A | 3/2006 |
| JP | 2007-182156 A | 7/2007 |
| JP | 2013-147185 A | 8/2013 |
| WO | 2009/019970 A1 | 2/2009 |

OTHER PUBLICATIONS

Jun. 16, 2014 International Search Report issued in Application No. PCT/IB2014/000120.

\* cited by examiner

*Primary Examiner* — Jason S Morrow
(74) *Attorney, Agent, or Firm* — Oliff PLC

(57) ABSTRACT

A vehicle front structure includes a roof header, which is arranged on a lower side of a front part of a roof panel of a vehicle in a longitudinal direction of the vehicle, and extends in a vehicle width direction, and a rear wall part, which is provided in the roof header, and extends towards the roof panel on the rear side of the roof header. The roof header is provided with a region in which a length of the roof header in a front-rear direction of the vehicle is longer than that of a surrounding area, and height of the rear wall part is smaller than that of the surrounding area.

3 Claims, 7 Drawing Sheets

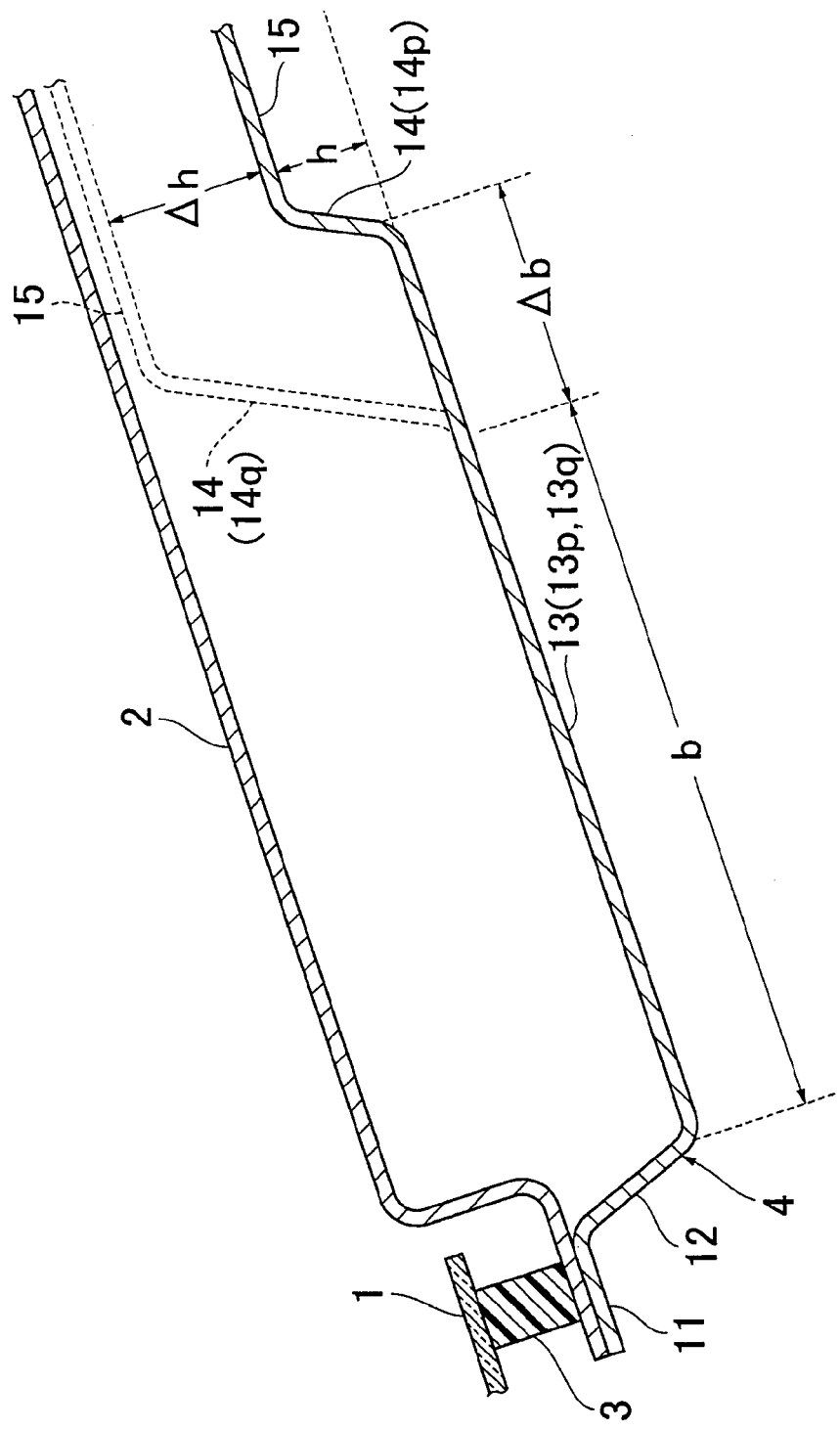

VEHICLE FRONT STRUCTURE

BACKGROUND OF THE INVENTION

1. Field of the Invention

The invention relates to a vehicle front structure.

2. Description of Related Art

In a front part of a vehicle, a windshield opening part is formed, to which a windshield is attached. An upper side of the windshield opening part is formed by a roof panel. On a lower side of a distal end part of the roof panel, a roof header is provided, extending in a vehicle width direction. As a vehicle front structure having such a roof header, Japanese Patent Application Publication No. 2007-182156 A (JP 2007-182156 A) discloses a roof header panel of a vehicle, which has groove parts with different groove depths like steps in a panel body of the roof header panel, as parts that facilitate bending deformation. The roof header panel of the vehicle forms parts in the panel body, which facilitates bending deformation. This makes it possible to reduce booming noise in a cabin that is caused by cabin resonance and so on.

Incidentally, a roof header is provided in order to improve strength against roof impact. However, a roof header causes booming noise due to resonance and so on. Therefore, the foregoing roof header described in JP 2007-182156 A reduces the booming noise as the roof header has the groove parts. However, in the roof header stated above, since the groove parts are formed as parts that facilitate bending deformation, the groove parts reduce strength against roof impact.

SUMMARY OF THE INVENTION

Thus, the present invention provides a vehicle front structure that is able to reduce occurrence of booming noise while maintaining strength against roof impact.

A first aspect of the present invention relates to a vehicle front structure. The vehicle front structure includes a roof header, which is arranged on a lower side of a front part of a roof panel of a vehicle in a longitudinal direction of the vehicle, and extends in a vehicle width direction, and a rear wall part, which is provided in the roof header, and extends towards the roof panel on the rear side of the roof header. The roof header is provided with a region in which a length of the roof header in a front-rear direction of the vehicle is longer than that of a surrounding area, and height of the rear wall part is smaller than that of the surrounding area.

According to the above aspect, the roof header has the region in which the length of the roof header in the front-rear direction is larger than that of the surrounding area, and the height of the rear wall part is smaller than that of the surrounding area. This means that the roof header has a region where the height of the rear wall part is smaller than that of the surrounding area, and the length of a bottom surface of the roof header in the front-rear direction is larger than that of the surrounding area. Since the region having a smaller height of the rear wall part than that of the surrounding area has smaller rigidity than the surrounding area, vibration, which is an antinode of a vibration mode, is likely to happen in the region, and, the length in the front-rear direction is larger than that of the surrounding area, so it is possible to increase vibration. As a result, it becomes possible to easily adjust resonance frequency of the roof header. The foregoing enables reduction in sound generated from a windshield, and reduction in booming noise in a cabin. Further, a recessed part, which is likely to trigger breakage, is not provided in a ridgeline part in a rear end of a bottom surface of the roof header, and a rear wall remains, thus enabling to secure strength against roof impact.

In the foregoing aspect, the height of the rear wall part in the above-mentioned region of the roof header may be smaller than ½ of the height of the rear wall part in the surrounding area. According to the above aspect, it is possible to vibrate the rear wall part in the above-mentioned region in the roof header more when vibration is generated. Therefore, it is possible to further reduce booming noise in a cabin.

According to the first aspect of the present invention, it is possible to reduce booming noise while maintaining strength against roof impact.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a sectional view taken along the line III-III in FIG. 2B;

DETAILED DESCRIPTION OF EMBODIMENTS

Figure 1:
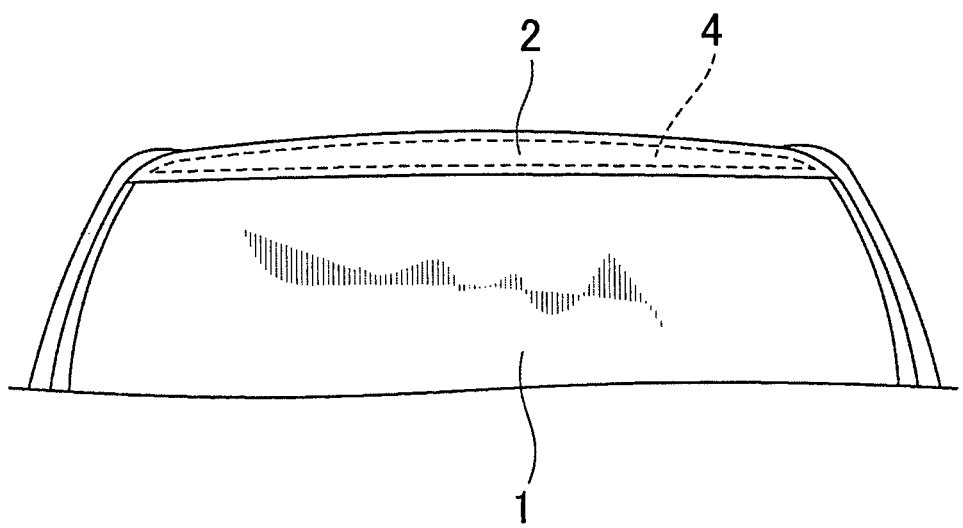
FIG. 1 is a front view showing a main part of a vehicle front structure according to an embodiment of the present invention.

An embodiment of the present invention will be explained below in detail using the drawings. The same reference numerals will be used to refer to identical or equivalent elements, and duplicated explanation will be omitted. Further, for convenience of illustration, ratios of dimensions in the drawings do not necessarily match those in the explanation. However, "front and rear, and upper and lower" in the explanation generally coincide with front and rear, and upper and lower of a vehicle, respectively.

Figure 2A:
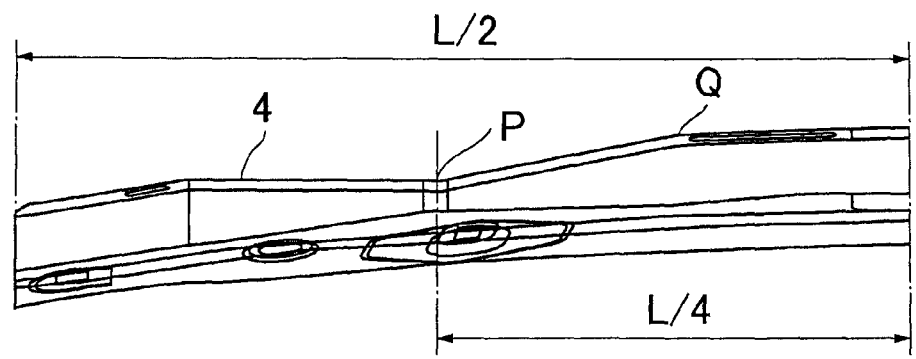
FIG. 2A is a side view showing a roof header that forms the vehicle front structure in FIG. 1.
Figure 2B:
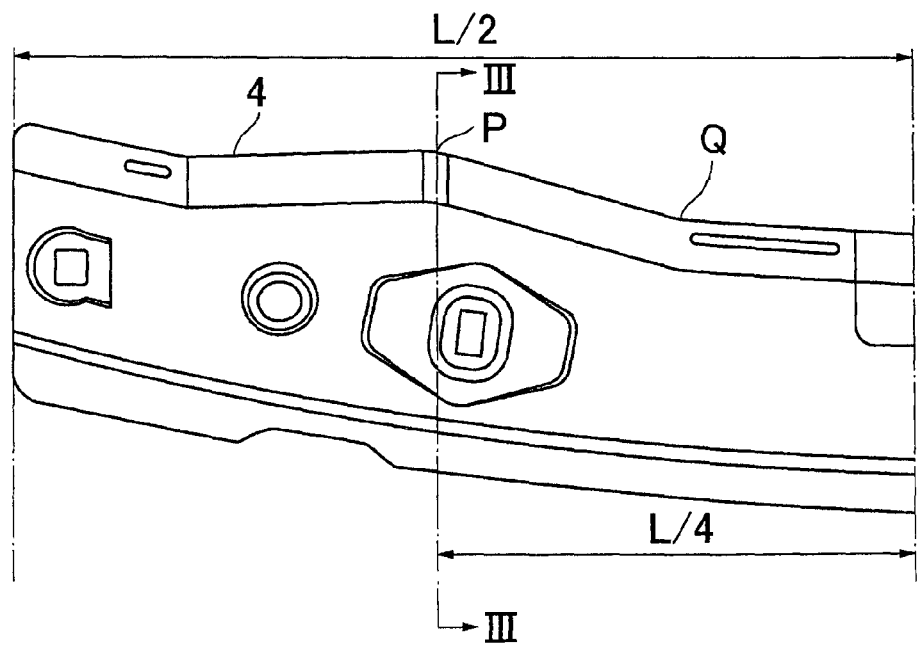
FIG. 2B is a bottom view showing the roof header that forms the vehicle front structure in FIG. 1.

As shown in FIG. 1 to FIG. 3, a vehicle front structure of this embodiment is arranged in a lower end of a front part of a roof panel 2 of the vehicle in a longitudinal direction of the vehicle, and is provided with a roof header 4 extending in a vehicle width direction. In the roof header 4, a rear wall part 14, extending towards the roof panel 2, is provided on a rear side of the roof header 4. Also, in the roof header 4, a region P is provided, in which a length of the roof header 4 in the front-rear direction is longer than that of a surrounding area, and height of the rear wall part 14 is smaller than that of the surrounding area. In other words, the length of the roof header 4 in the region P in the front-rear direction is larger than the length of a region Q that surrounds the region P (see FIG. 2A and FIG. 2B) in the front-rear direction, and, the height of the rear wall part 14 in the region P (hereinafter referred to as a rear wall part 14p) is smaller than the height of a rear wall part 14 in the surrounding region Q (referred to as a rear wall part 14q). The "height" in the explanation generally coincides with length of a distance viewed from a given point on an inner side of the vehicle. In other words, the closer it is from the given point on the inner side of the vehicle, the lower it is expressed. Here, the region P in the roof header 4 functions as a vibration adjusting part that adjusts vibration given to the roof header 4.

As shown in FIG. 1, the vehicle front structure according to this embodiment includes a windshield 1. The roof panel 2 stated above is provided in an upper part of the windshield 1, and the roof header 4 is provided below the front end part of the roof panel 2. As shown in FIG. 3, an upper end part of the windshield 1 is adhered to a distal end part of the roof panel 2 by a urethane sealer 3.

FIG. 2A and FIG. 2B show a structure of the roof header 4 in the left half of the vehicle. The shape of the roof header 4 in the right half of the vehicle is similar to the shape of the roof header 4 in the left half of the vehicle. As shown in FIG. 2A and FIG. 2B, the roof header 4 is extended in the vehicle width direction, and forms different shapes depending on positions in the vehicle width direction. To be specific, in the roof header 4, when a vehicle width is L, the shape of the region P located on the left side by L/4 from a central part of the vehicle in the vehicle width direction, and a shape of the region Q surrounding the region P are different. FIG. 2A is a view of the roof header 4 seen from the rear, FIG. 2B is a view of the roof header 4 seen from below, and FIG. 3 shows a shape of a section taken along III-III in FIG. 2B.

As shown in FIG. 3, a front end part 11, extending to the front, is formed in a front end of the roof header 4. The front end part 11 is fixed to the roof panel 2 by, for example, welding. A sectional shape of the front end part 11 is a shape that ascends linearly towards the rear side. A sectional shape of the roof panel 2 is also a shape that ascends towards the rear side. An ascending ratio of the front end part 11 in the roof header 4, and an ascending ratio of a front end part of the roof panel 2 are generally the same.

On the rear side of the front end part 11 of the roof header 4, a front wall part 12 is formed with a sectional shape that descends towards the rear side. The front end part 11 and the front wall part 12 are formed continuously. On a further rear side of the front wall part 12, an extending part 13 extends to the rear. The extending part 13 has a sectional shape that ascends gradually towards the rear side. An ascending ratio of the extending part 13 in the roof header 4, and an ascending ratio of the front end part of the roof panel 2 are generally the same. On the rear side of the extending part 13, the rear wall part 14 is formed so as to extend towards the roof panel 2.

The shapes of the extending part 13 and the rear wall part 14 are different depending on positions in the vehicle width direction. Specifically, as shown in FIG. 3, the length of the extending part 13 (hereinafter, referred to as an extending part 13$q$) in the region Q surrounding the above-mentioned region P is b. On the other hand, the length of the extending part 13$p$ in the region P (hereinafter, referred to as an extending part 13$p$) in the region P has a length of b+Δb. Then, the height of the rear wall part 14$q$ in the region Q is h+Δh. On the other hand, the height of the rear wall part 14$p$ in the region P is h. As stated above, the height of the rear wall part 14$p$ is smaller than the height of the rear wall part 14$q$ by Δh. When the height of the extending part 13$p$ is used as a base (zero), the height of the rear wall part 14$p$ is less than ½ of the height of the rear wall part 14$q$. From the region Q towards the region P in the vehicle width direction, the extending part 13 becomes longer gradually, and the rear wall part 14 becomes shorter gradually.

A rear end part 15 is formed on the rear side of the rear wall part 14. The rear end part 15 has a linear sectional shape, and is arranged along a surface of the roof panel 2. Further, the rear end part 15 is fixed to the roof panel 2 by, for example, mastic adhesion. This way, the roof header 4 is attached to the roof panel 2 in the front end part 11 and the rear end part 15.

In the vehicle front structure having the above-mentioned structure according to this embodiment, the roof header 4 has the region P in which the length of the roof header 4 in the front-rear direction is longer than that of the surrounding region Q, and the height of the rear wall part 14 is smaller than that of the region Q. In other words, the roof header 4 has the region P in which the height of the rear wall part 14 is smaller than that of a surrounding area, and the length of the bottom surface of the roof header 4 in the front-rear direction is larger than that of the surrounding area. The region P, in which the height of the rear wall part 14 is smaller than that of the surrounding area, has lower rigidity compared to the surrounding area. Therefore, vibration that is antinode of a vibration mode is likely to happen in the region P, and, because the length of the region P in the front-rear direction is longer than that of the surrounding area, it is possible to increase vibration. As a result, it becomes possible to adjust resonance frequency of the roof header 4 easily. It is evident from the foregoing that it is possible to reduce sound generated from the windshield 1, and reduce booming noise in a cabin. Also, a recessed part, which is likely to trigger breaking, is not provided in a ridge line part of a rear end of the bottom surface in the roof header 4, and the rear wall remains, thereby enabling to ensure strength against roof impact.

Further, in this embodiment, the position of the region P in which the height of the rear wall part 14 is reduced, is set to the left (the right) by L/4 from the central part in the vehicle width direction, which becomes the antinode of a secondary bending mode. Therefore, by increasing motion energy of the roof header 4, it becomes possible to reduce secondary resonance of the windshield 1 effectively without increasing the mass of the roof header 4.

Next, operations and effects of the roof header 4 according to this embodiment will be explained based on a comparison between a roof header to compare (hereinafter referred to as a comparative roof header), and the roof header 4 according to this embodiment. First of all, a structure of the comparative roof header will be explained.

Figure 5:
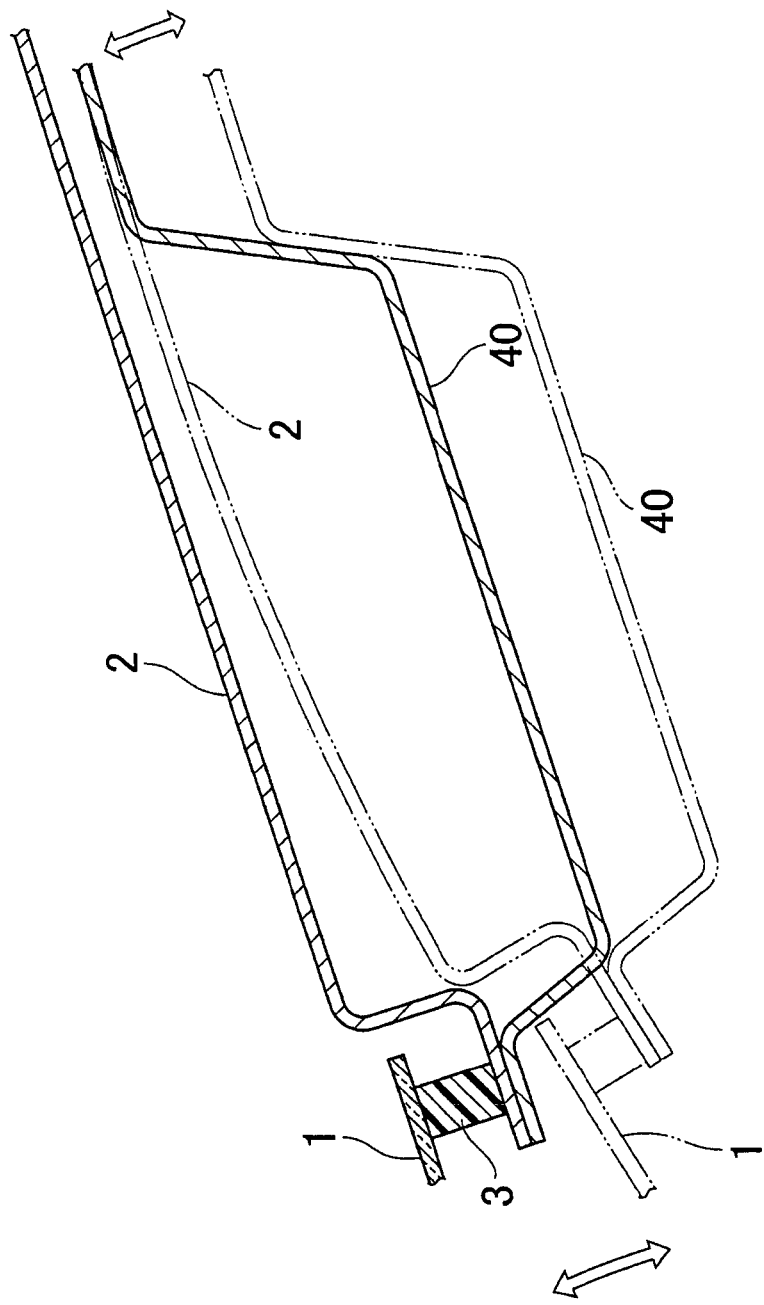
FIG. 5 is a view showing a deformed state of a roof header of a comparative example in a deforming mode.

As shown in FIG. 5, a vehicle front structure having the comparative roof header 40 includes a windshield 1 and a roof panel 2 similarly to this embodiment, and the windshield 1 and the roof panel 2 are adhered to each other by a urethane sealer 3. The comparative roof header 40 is provided at a front-lower position of the roof panel 2.

Similarly to the roof header 4, the comparative roof header 40 includes a front end part 11, a front wall part 12, and extending part 13, a rear wall part 14, and a rear end part 15. However, comparative roof header 40 is not provided with a region that is equivalent to the region P in the roof header 4. At every position in the vehicle width direction, the length of the extending part is b, and the height of the rear wall part is h+Δh.

Figure 4:
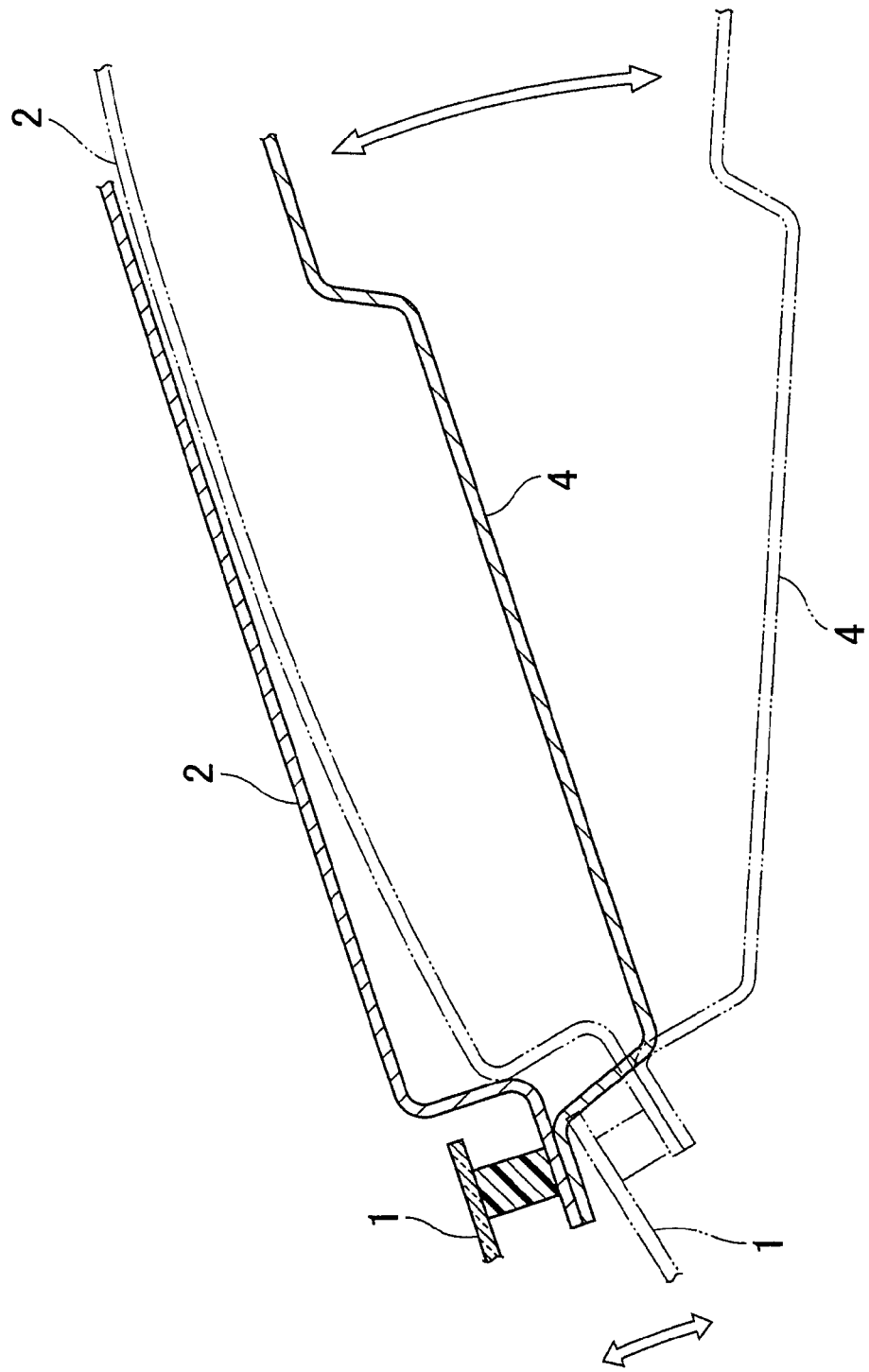
FIG. 4 is a view showing a deformed state of the roof header in FIG. 2A and FIG. 2B in a deforming mode.

Next, effects in a deforming mode when vibration is given to the roof header 4 of this embodiment and the comparative roof header 40 will be explained with reference to FIG. 4 and FIG. 5. In FIG. 4 and FIG. 5, solid lines show states before deformation, and chain double-dashed lines show states after deformation.

First of all, as shown in FIG. 5, in the comparative roof header 40, a front end part of the comparative roof header 40 on the side of the windshield 1, and a rear end part of the comparative roof header 40 vibrate with the same vibration level and phase. Therefore, the whole comparative roof header 40 vibrates with generally the same vibration level and phase. In general, a mass of a windshield is larger than a mass of a roof header. Therefore, in order to reduce resonance frequency of a windshield in such a roof header, it is necessary to either add a large mass to a position that becomes an antinode of a vibration mode, or to reduce rigidity significantly. In the case of reducing rigidity in particular, it is difficult to achieve both reduction of resonance frequency of the windshield and rigidity against roof impact.

On the contrary, in the roof header 4 according to this embodiment, rigidity of the rear side of the roof header 4 is reduced by reducing the height of the rear wall part 14p in the region P located to the left (right) by L/4 from the central part in the vehicle width direction. In addition, the length of the extending part 13p in the region P is extended, thus increasing vibration of the rear part of the roof header 4 during secondary resonance as shown in FIG. 4. Thus, motion energy of the roof header 4 is increased. As a result, in a vibration system formed by the windshield 1 and the roof header 4, contribution of vibration of the roof header 4 becomes relatively large. Therefore, it becomes possible to easily reduce resonance of the windshield 1 that actually has greater mass than that of the roof header 4. The rear part of the roof header 4 is adhered to the roof by a resin-based adhesive. The rear part of the roof header 4 does not contribute to up-and-down bending rigidity of the roof header as much as the front part of the roof header 4, which is joined to the roof by welding. Therefore, reduction in rigidity by reducing the rear wall has minor influence. Hence, according to the foregoing, it is possible to reduce resonance frequency of the windshield 1 with little reduction in rigidity of the roof header 4.

Figure 6:
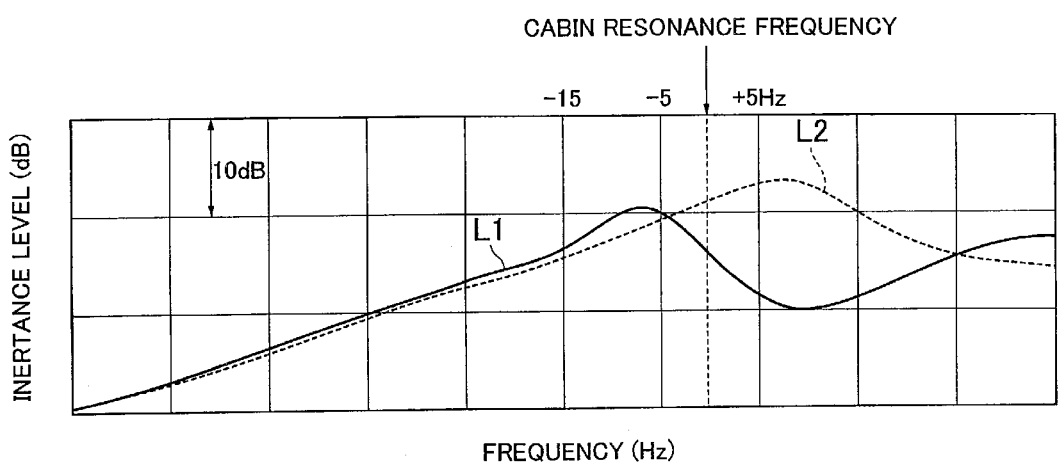
FIG. 6 is a graph showing vibration characteristics (inertance levels) of a windshield.
Figure 7:
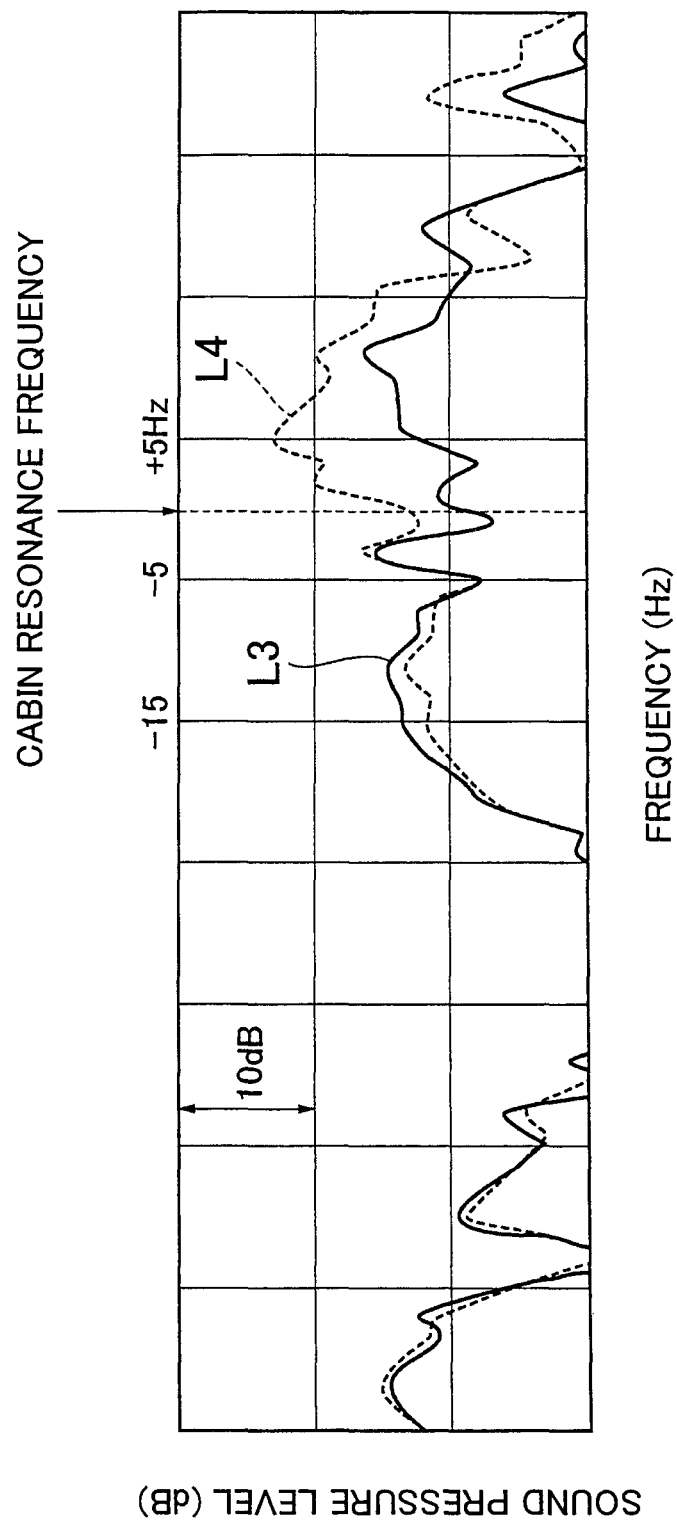
FIG. 7 is a graph showing generated sound pressure from the windshield when road noise is inputted.

Vibration characteristics of the windshields 1 using the roof header 4 according to this embodiment and the comparative roof header 40 will be explained with reference to FIG. 6 and FIG. 7. Explained first are results of inertance levels when exciting force in opposite phases in the up-and-down direction is added to upper ends of the windshield 1 on both left and right sides in order to excite secondary resonance of the windshield 1. As shown in FIG. 6, an entire first line L, which shows a vibration characteristic of the windshield 1 in a case where the roof header 4 according to this embodiment is used, is lower than a second line L2 showing a vibration characteristic of the windshield 1 in a case where the comparative roof header 40 is used. Therefore, compared to the comparative roof header 40, resonance is reduced when the roof header 4 according to this embodiment is used. The inertance level is particularly lowered near cabin resonant frequency. This proves that the roof header 4 according to this embodiment has a better vibration characteristic compared to the case where the comparative roof header 40 is used.

Further, a sound volume of the windshield 1 when road noise is inputted in each of a vehicle having the roof header 4 according to this embedment and a vehicle having the comparative roof header 40 will be explained. As shown in FIG. 7, an entire third line L3, which indicates a sound pressure level when road noise is inputted in the case where the roof header 4 is used, is lower than a fourth line L4 showing a sound pressure level when road noise is inputted in the case where comparative roof header 40 is used. Therefore, the sound pressure level is lowered when the roof header 4 according to this embodiment is used, compared to the comparative roof header 40. Hence, when the roof header 4 according to this embodiment is used, the sound volume from the windshield 1 in the road noise is reduced compared to the case where the comparative roof header 40 is used. Accordingly, road noise is reduced.

The embodiment explained above is an embodiment of a vehicle front structure according to the present invention, and the vehicle front structure according to the present invention is not limited to that described in the foregoing embodiment. The vehicle front structure according to the present invention may be the vehicle front structure according to the foregoing embodiment, which is modified or applied to something different without changing the scope of the respective claims.

For example, in the foregoing embodiment, the example was explained where the region P, which is made by decreasing the height of the rear wall part 14 and increasing the length of the extending part 13 in the front-rear direction, is provided at a position to the left (to the right) from the central part in the vehicle width direction by L/4. However, the position where the region P is provided is not limited to the above, and may be changed appropriately. To be specific, the region P may be provided in, for example, the central part in the vehicle width direction, and, in this case, it is possible to reduce primary resonance effectively.

Also, as shown in FIG. 3, in this embodiment, the example was explained where the length of the extending part 13p is b+Δb, the length of the extending part 13q is b, the height of the rear wall part Hp is h, and the height of the rear wall part 14q is h+Δh. However, values of b, h, Δb, and Δh may be set as appropriate. Specifically, for example, the values of the Δb and Δh may be the same, and, in this case, the sum of the length of the extending part 13p and the length of the rear wall part 14p, that is b+Δb+h, and the sum of the length of the extending part 13q and the length of the rear wall part 14q, that is b+h+Δh, become the same. Since the sum of the length of the extending part 13 and the height of the rear wall part 14 becomes the same regardless of a position in the vehicle width direction, the roof header 4 is easily manufactured, which also makes it possible to restrain reduction in yield of members.

What is claimed is:

1. A vehicle front structure, comprising:
   a roof header, which is arranged on a lower side of a front part of a roof panel of a vehicle in a longitudinal direction of the vehicle, and extends in a vehicle width direction; and
   a rear wall part, which is provided in the roof header, and extends towards the roof panel on a rear side of the roof header, wherein
   the roof header is provided with a region in which a length of the roof header in a front-rear direction of the vehicle is longer than that of a surrounding area, and height of the rear wall part is smaller than that of the surrounding area.

2. The vehicle front structure according to claim 1, wherein the height of the rear wall part of the region of the roof header is less than ½ of the height of the rear wall part in the surrounding area.

3. The vehicle front structure according to claim 1, wherein the height of the rear wall part in the region of the roof header is least on an outside by L/4 from a central part of the vehicle in the vehicle width direction, L is the vehicle width.

* * * * *